United States Patent [19]

Kodis

[11] 4,057,015

[45] Nov. 8, 1977

[54] BAR CODE PRINTING SYSTEM

[75] Inventor: Robert D. Kodis, Brookline, Mass.

[73] Assignee: Di/An Controls, Inc., Boston, Mass.

[21] Appl. No.: 663,905

[22] Filed: Mar. 4, 1976

[51] Int. Cl.$^2$ .......................... B41J 1/60; B41F 31/00
[52] U.S. Cl. .......................... 101/93.29; 101/93.27; 101/349
[58] Field of Search ........................ 101/66, 67, 68, 69, 101/93.21, 93.27, 93.38, 93.39, 93.4, 93.41, 93.48, 224, 226, 227, 348, 349, 350, 228, 93.29

[56] References Cited

U.S. PATENT DOCUMENTS

| 2,669,926 | 2/1954 | Ford ........................ 101/66 |
| 2,694,972 | 11/1954 | Seeney ..................... 101/67 |
| 2,869,454 | 1/1959 | Lang ....................... 101/93.21 |
| 2,953,986 | 9/1960 | Jensen ..................... 101/93.21 |
| 3,015,265 | 1/1962 | Gmeiner ................... 101/93.21 |
| 3,049,078 | 8/1962 | Smith, Jr. ................. 101/228 |
| 3,158,090 | 11/1964 | Wasserman ................. 101/93.29 |
| 3,253,542 | 5/1966 | McDonough ................ 101/348 X |
| 3,356,199 | 12/1967 | Robinson ................... 101/93.29 X |
| 3,366,044 | 1/1968 | Marsh, Jr. ................. 101/93.29 |
| 3,415,184 | 12/1968 | Perucca .................... 101/93.27 |
| 3,724,631 | 4/1973 | Kaczeus .................... 101/93.17 |
| 3,734,012 | 5/1973 | Huggins .................... 101/93.29 |
| 3,747,517 | 7/1973 | Robaczek ................... 101/93.29 |
| 3,757,685 | 9/1973 | Woodie et al. .............. 101/66 |
| 3,786,747 | 1/1974 | Szpitalak .................. 101/350 |
| 3,869,980 | 3/1975 | Schroeder, Jr. ............. 101/93.21 |
| 3,890,893 | 6/1975 | Kodis ...................... 101/227 X |
| 3,902,419 | 9/1975 | Pflugbeil et al. ........... 101/93.48 |
| 3,951,061 | 4/1976 | Bremmer, Jr. ............... 101/93.21 |

Primary Examiner—Russell R. Kinsey
Assistant Examiner—Paul J. Hirsch
Attorney, Agent, or Firm—Morse, Altman, Oates & Bello

[57] ABSTRACT

A printing system with a rotatable print drum having rows of raised printing elements disposed about its periphery in arcuate columns, each column having matching bar printing elements positioned at diametrically opposite locations. An impactor assembly cooperates with each column of printing elements for printing indicia on a web advanced between the rotating drum and impactor assembly, the web being pressed against specific printing elements by the impactor assembly. A processor receives coded data signals defining specific bar code indicia and generates command signals for selectively energizing the impactor assembly. Similar bars are printed on the web by pressing the web against alternate ones of the matching bar printing elements for successive coded data signals representing the same bar.

11 Claims, 8 Drawing Figures

BAR CODE PRINTING SYSTEM

BACKGROUND OF THE INVENTION

1. Field of the Invention

The present invention relates to printing systems and, more particularly, is directed towards bar code printing systems.

2. Description of the Prior Art

High speed printing systems have been designed for use with electronic computers in the printing of alphanumerical characters and symbols on webs such as ticket blanks, labels and the like. One high speed printing system is the on-the-fly printer, which includes a rotating drum and ballistic elements. The print drum is provided with raised printing elements that are disposed about its periphery in arcuate columns, each printing element having a unique address location. A document to be printed is fed into a print gate disposed between the drum and ballistic elements. In response to coded signals representing a particular character to be printed, the ballistic elements are actuated for urging the document against the printing elements on the print drum. The coded signals define a particular address on the drum at which the character to be printed is located.

Although high resolution is desirable, it is not critical unless the printed characters are machine readable bar codes. Reliable reading of bar code indicia is realized if the bar imprints are well defined with good contrast and there are no unprinted areas. The readable quality of the bar imprint depends upon how well the printing elements are inked. Generally, the print drum of the on-the-fly printer is inked by an ink roller that presses against the drum as it rotates. If the drum makes several revolutions in contact with the ink roller before the bar printing element is used, the quality of the resulting bar code imprint is high. Such printers suffer from the disadvantage of long printing times. If the drum makes only one revolution in contact with the ink roller before the bar printing element is used, the bar code imprint is light and may contain unprinted area within its boundaries. Such printing systems suffer from the disadvantage of limited reliability in the reading of the bar code messages.

SUMMARY OF THE INVENTION

It is an object of the present invention to provide a high speed printing system for printing alphanumeric characters and symbols and bar code messages on a web such as tickets, labels and the like. The bar code messages are characterized by bar imprints that are well defined with good contrast and are capable of being read reliably. The printing system includes a rotatable print drum having rows of raised printing elements disposed about its periphery in arcuate columns, each printing element having a unique address and certain ones of the printing elements being bar printing elements. The columns containing bar printing elements are provided with at least two matching bar printing elements at diametrically opposite positions. An impactor assembly having ballistic elements for each row of printing elements cooperates with the drum for urging the web against the raised printing elements for each revolution of the drum. A processor receives coded data signals representing specific printing element addresses and generates command signals for selectively energizing the ballistic elements. Successive data code signals representing the unique address of one of the matching bar elements is converted to a data signal defining the address of alternate ones of the matching bar elements. That is, although the received coded data signal defines a unique address of a particular bar printing element, the web is urged against alternate ones of the matching bar printing elements and a different raised element of the same bar image is used to make an impression on the web. In consequence, alternate ones of the matching bar printing elements are used on successive rotations of the drum and each bar printing element is inked at least twice before it is used for printing a bar on the web.

It is another object of the invention to provide a multiple document printing system for printing alphanumeric characters and symbols and bar code messages simultaneously on at least two document blanks. The printing system includes a single drive motor and at least two printing stations disposed between a print drum and a plurality of ballistic elements. The document blanks are advanced independently by pinch and brakes assemblies to a predetermined position relative to the print stations. The document blanks are incrementally and independently advanced through the printing stations and the ballistic elements are selectively energized for simultaneously printing the documents. Upon completion of the printing cycle, each document is advanced to a selected position where they are simultaneously severed by a rotary cutter and dispensed from the system by an eject assembly.

Other objects of the present invention will in part be obvious and will in part appear herinafter.

The invention accordingly comprises the devices, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
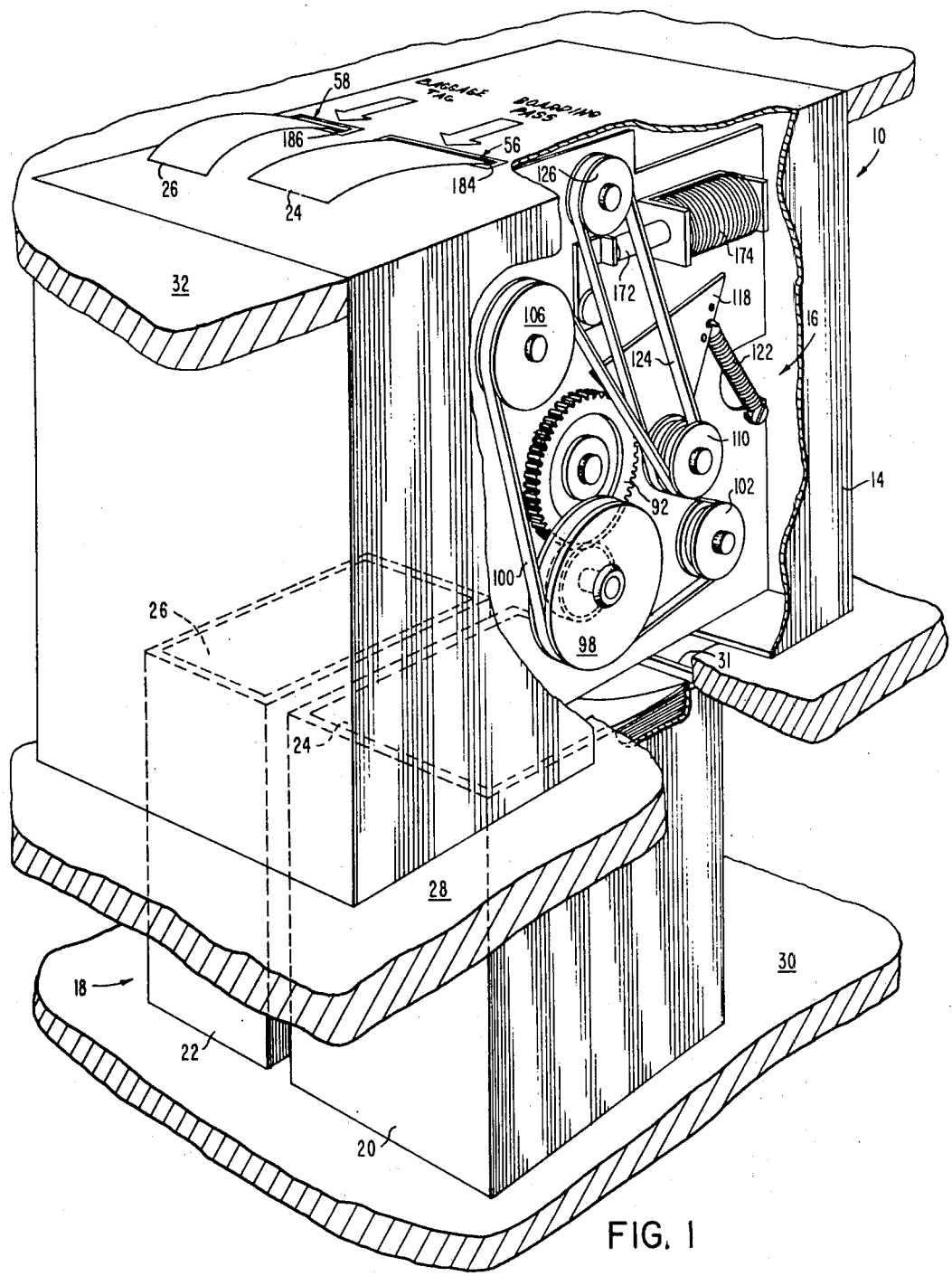
FIG. 1 is a perspective view, partly cutaway, of a printing system embodying the invention.
Figure 6:
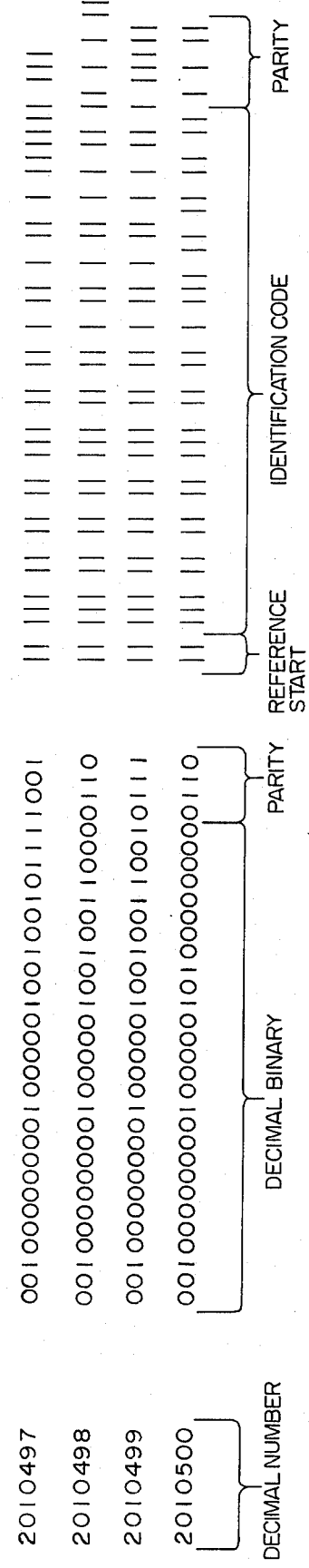
FIG. 6 is illustrative of a printed bar code message.

Referring now to the drawings, particularly FIG. 1, there is shown a high speed, on-the-fly printing system 10 embodying the present invention for simultaneously printing alphanumeric characters, symbols and bar code messages on a plurality of documents and for dispensing the imprinted documents. As hereinafter described, printing system 10 prints bar code messages on the documents by impacting the documents against alternate ones of matching bar printing elements disposed in columns acuately disposed about a rotatable print drum. A bar code message is defined by a sequence of selectively spaced imprints of bars of certain widths and heights as shown in FIG. 6 for example. In the illustrated embodiment, printing system 10 is an airline departure terminal that is interconnected with an on-line, real time, communications system terminal 12, which generates coded data signals representing messages to be printed. Departure terminal 10 comprises a housing 14 in which there is mounted a multiple document printer 16 and a storage assembly 18 which contains blank documents to be printed. By way of example, departure terminal 10 prints and dispenses boarding passes and baggage tags. Storage assembly 18 includes hoppers 20 and 22 which contain an endless web of boarding pass blanks 24 and an endless web of baggage tag blanks 26, respectively, each blank being fan-folded in its respective hopper in a Z-configuration. Housing 14 and hoppers 20, 22 are supported on shelves 28 and 30, respectively, the upper face of housing 14 being substantially flush with the top of a counter 32. Shelf 28 is formed with an opening 31 through which boarding pass blanks 24 and baggage tag blanks 26 are fed to multiple document printer 16. Hopper 20 and 22 are opened containers having substantially rectangular profiles.

Figure 3:
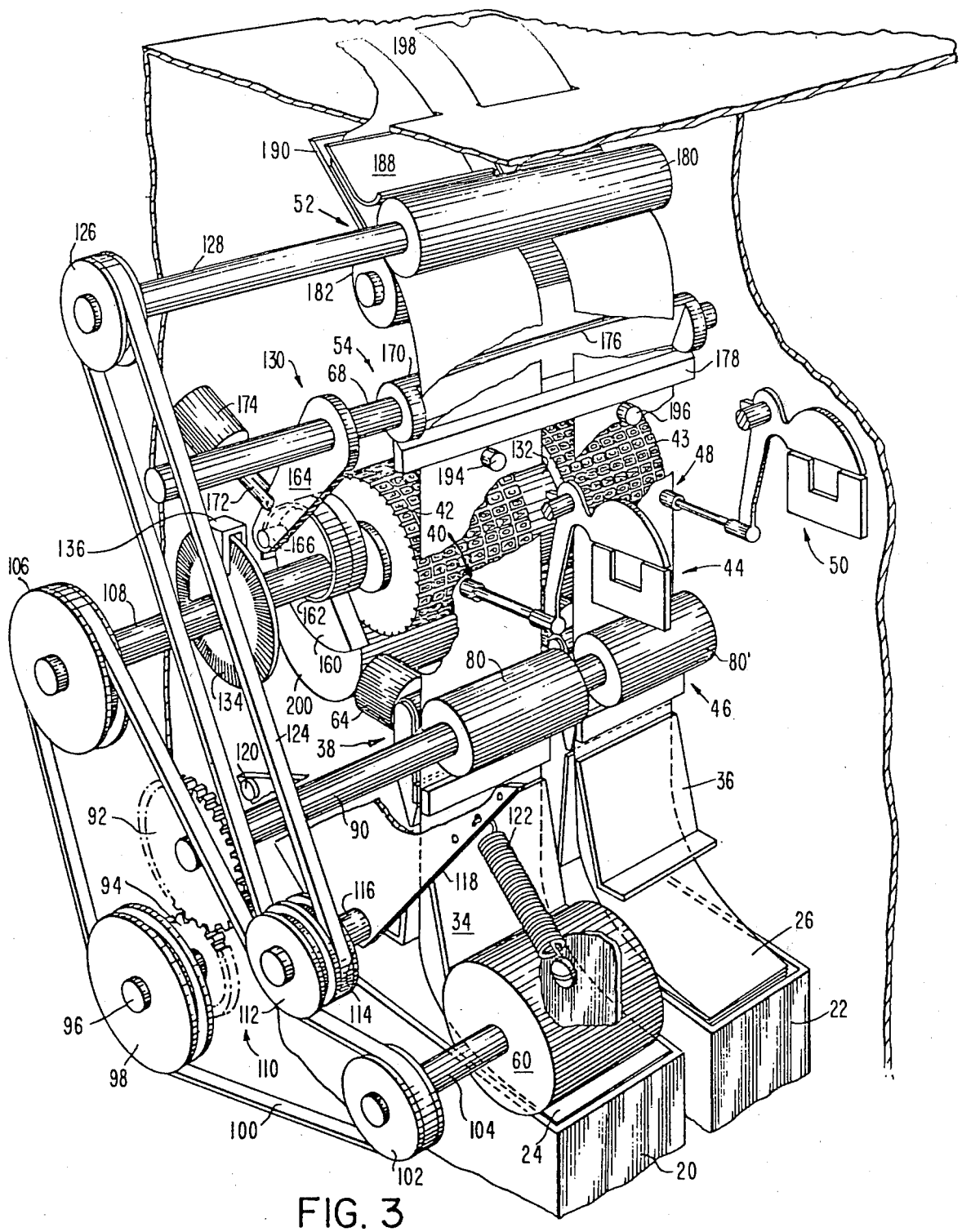
FIG. 3 is a schematic diagram in perspective illustrating certain principles of the invention.
Figure 4:
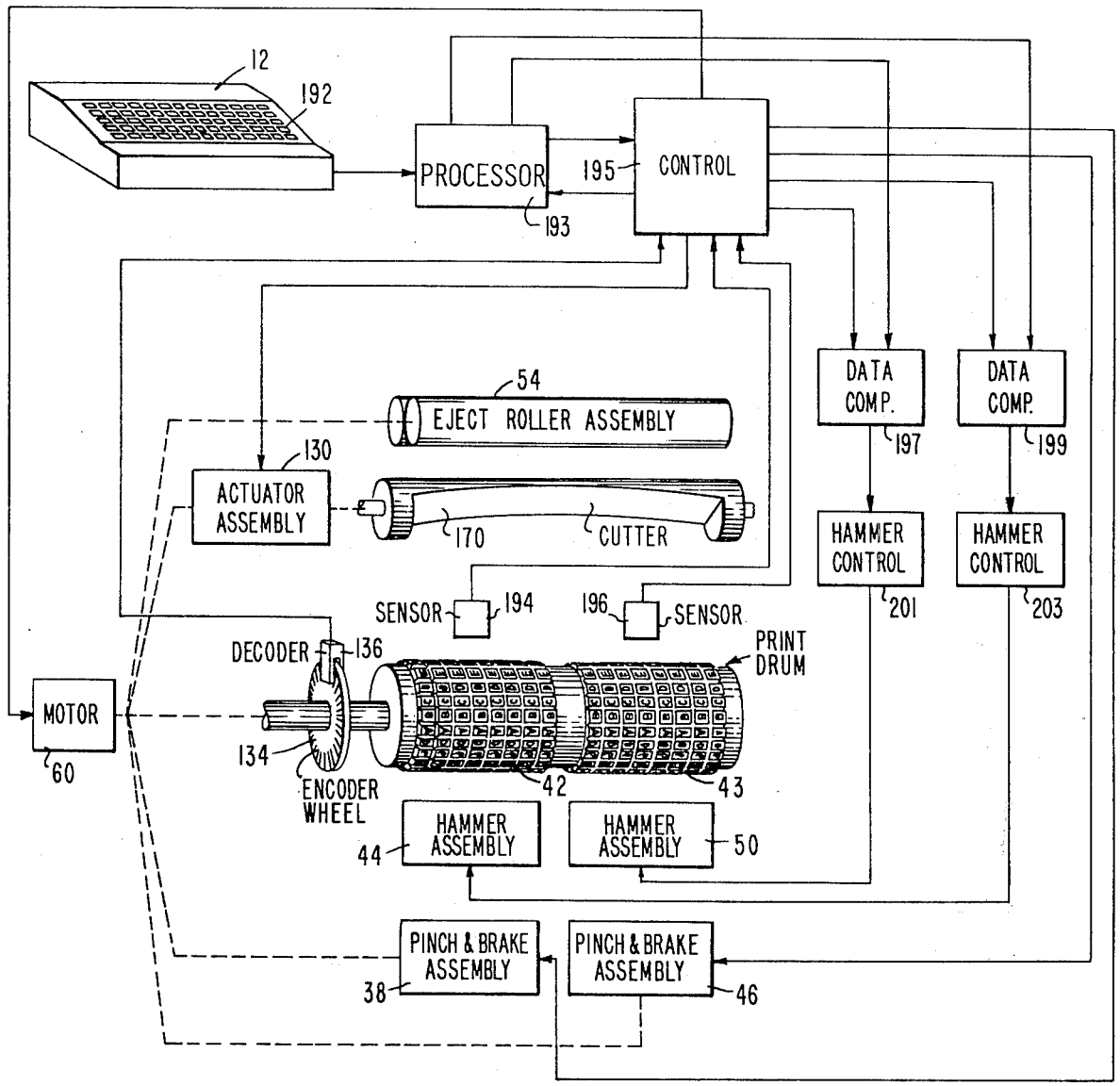
FIG. 4 is a block and schematic diagram, somewhat in perspective, of the printing system of FIG. 1.

As best shown in FIG. 3, boarding pass blanks 24 and baggage tag blanks 26 are received within guides 34 and 36, respectively, which extend downwardly from housing 14 in registration with the open ends of hoppers 20 and 22. A pinch and brake assembly 38 feeds boarding pass blanks 24 into a print station 40 between a print drum 42 and a ballistic hammer assembly 44. A pinch and brake assembly 46 feeds baggage tag blanks 26 into a print station 48 between a print drum 43 and a ballistic hammer assembly 50. Printing is accomplished by selectively energizing ballistic hammer assemblies 44 and 50 as the boarding pass blanks and baggage tag blanks are incrementally advanced through their respective print stations. When the printing cycle is completed, the boarding pass and baggage tag are slewed to a predetermined position and are engaged by an eject roller assembly 52. Although the document blanks are printed simultaneously, the printing of one blank may be completed before the printing of the other blank. In this case, the first completely printed blank is slewed to the predetermined position and waits there until the other blank is completely printed. When both the printed boarding pass and the printed baggage tag are at the predetermined position, a rotary cutter assembly 54 severs the printed documents. The severed boarding pass and baggage tag are fed through guides 56 and 58, respectively, by eject roller assembly 52.

Figure 2:
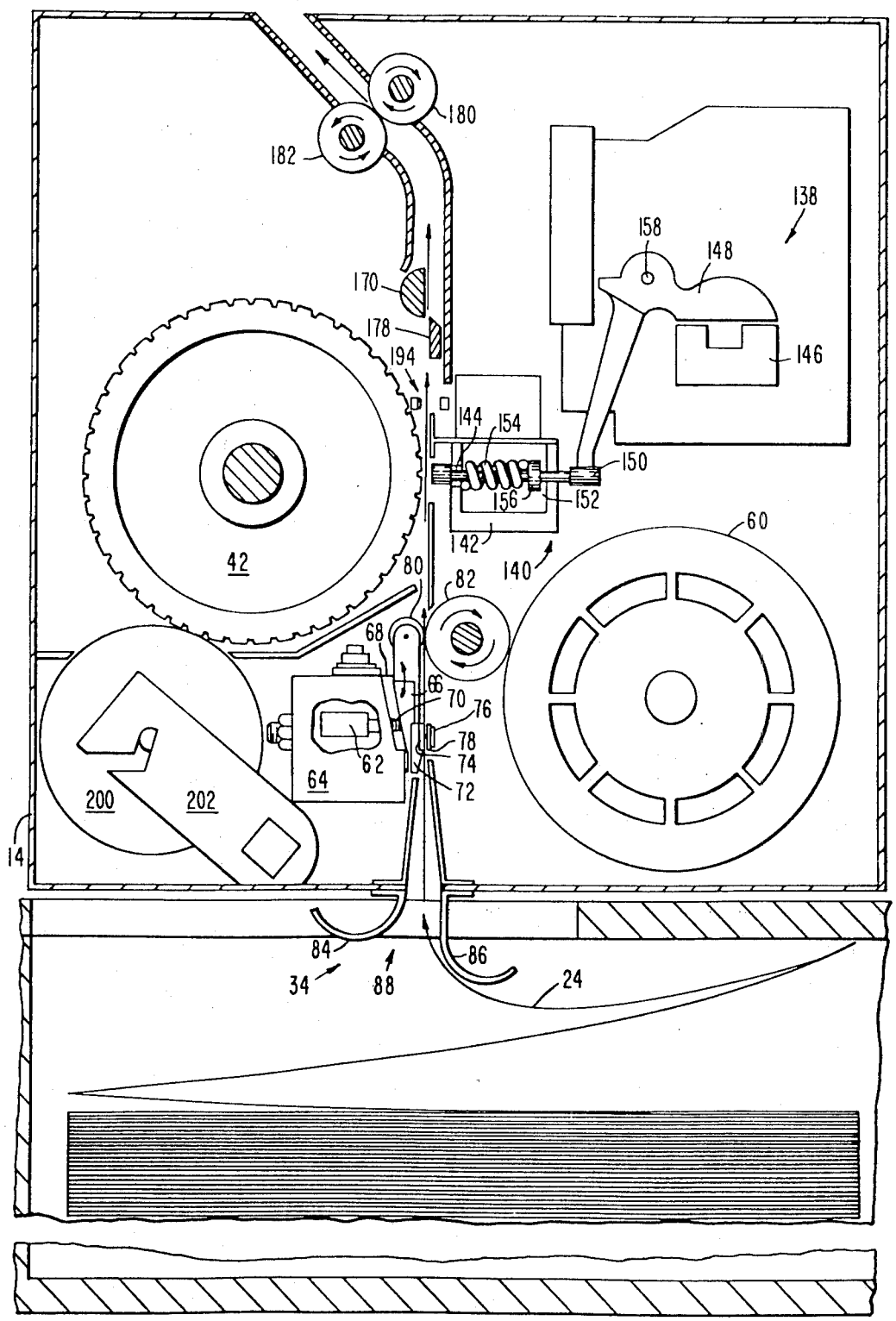
FIG. 2 is a side elevation of the printing system of FIG. 1.

Printer 16 includes a single drive motor 60 which is operatively connected to pinch and brake assemblies 38, 46; print drums 42 and 43; rotary cutter assembly 54; and eject roller assembly 52. As best shown in FIG. 2, pinch and brake assembly 38 includes an actuator 62, for example a solenoid, which is mounted to a housing 64. A rocker arm 66 is pivotally mounted to housing 64 by means of a resilient arm 68. A bias element 70, for example a spring, is operatively connected to housing 64 and rocker arm 66. An upper brake 72 having a shoe 74 is mounted at one end of rocker arm 66. A lower brake 76 having a shoe 78 is mounted in spaced relationship to brake 72 at an opposite face of boarding pass blanks 24, shoes 74 and 78 being adapted for engagement and disengagement with the boarding pass blanks. An idler capstan 80 is rotatably mounted to the other end of rocker arm 66. A drive capstan 84, which is mounted in spaced relationship to idler capstan 80 on an opposite face of boarding pass blanks 24, is drivingly connected to motor 60.

When pinch and brake assembly 38 is in an inactive state boarding pass blanks 24 are held stationary and when pinch and brake assembly 38 is in an active state boarding pass blanks 24 are advanced. In the inactive state, solenoid 62 is deenergized and spring 70 pivots rocker arm 66. In consequence, shoe 74 is pivoted towards shoe 78 and idler capstan 80 is pivoted away from drive capstan 82. Boarding pass blanks 24 are captively held between shoes 74 and 78. In the active state, solenoid 62 is energized, and the pressure applied by spring 70 against rocker arm 66 is overcome. In consequence, shoe 74 is pivoted away from shoe 78 and idler capstan 80 is pivoted towards drive capstan 82. Boarding pass blanks 24 are frictionally engaged between idler capstan 80 and drive capstan 82. The rotation of drive capstan 82 is such that the boarding pass blanks are pulled out of hopper 20 and are advanced towards print station 40. Guide 34, which defines a guideway through which boarding pass blanks 24 are threaded, includes a pair of plates 84 and 86 having substantially J-shaped profiles in right cross section. Plates 84 and 86 are mounted to housing 14 at the bottom face thereof in spaced relationship to one another, a substantially triangular shaped entranceway 88 having an enlarged mouth for receiving the boarding pass blanks from hopper 20.

Pinch and brake assembly 46 is similar in construction to pinch and brake assembly 38, the former operative to advance baggage tag blanks 26 from hopper 22 and the latter operative to advance boarding pass blanks 24 from hopper 20. Corresponding parts of pinch and brake assemblies 38 and 46 are denoted by like reference characters and are distinguished from one another by a primed notation. Drive roller 80 of pinch and brake assembly 38 and a drive roller 80' of pinch and brake assembly 46 are mounted on a common shaft 90 having a gear 92 which is engaged by a gear 94 on a shaft 96. A pulley 98, which is configured to drivingly engage an endless belt 100, is mounted to shaft 96. Endless belt 100 is threaded about a pulley 102 which is connected to a shaft 104 of motor 60 and a pulley 106 which is connected to a shaft 108. A pulley assembly 110, which includes a pair of pulleys 112 and 114, is rotatably mounted to a shaft 116 extending from a clutch plate 118. Pulley 112 engages endless belt 100. Plate 118 has a substantially triangular profile and is pivotally mounted to housing 14 by a pin 120. One end of a bias element 122, for example a spring, is attached to plate 118 and the other end of the spring is fixed to housing 14. An endless belt 124 is threaded about pulley 114 and a pulley 126 which is mounted to a shaft 128 that is operatively connected to eject roller assembly 52. Clutch plate 118 is operatie to control the tension applied to endless belt 100. Pulley 106 rotates shaft 108 which carries print drums 42, 43 and an actuating mechanism 130 for rotary cutter assembly 52.

Figure 5:
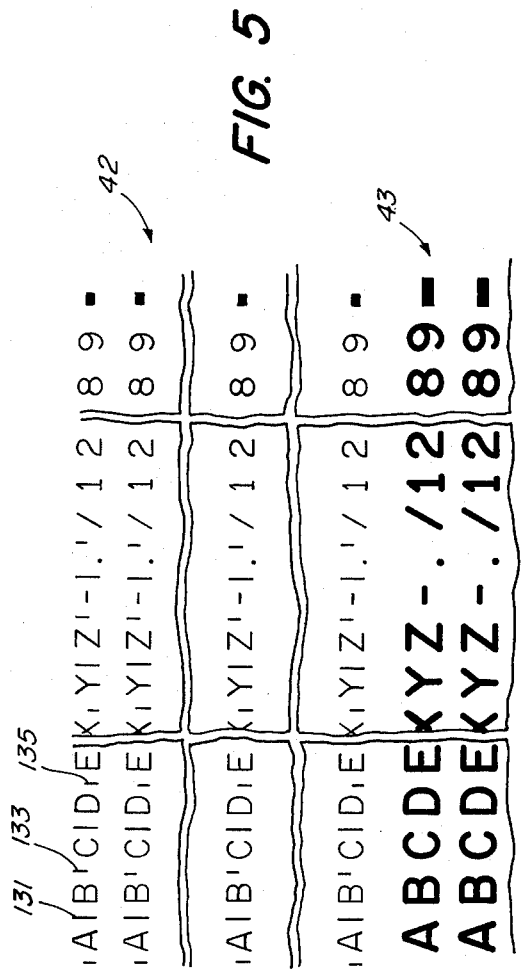
FIG. 5 is a rolled image of the print drum of FIG. 1.

Print drum 42 includes rows of characters defining a raised column of printing elements arcuately disposed about the periphery of the drum, adjacent rows being in spaced parallel relationship to one another. Print drum 43 includes rows of characters defining a raised column of printing elements arcuately disposed about the periphery of the drum, adjacent rows being in spaced parallel relationship to one another. The printing elements of each drum are inked by an ink roller 200 which is impregnated with a dye mixture containing a fine powder black pigment. As shown in FIG. 5, certain ones of the columns of the printing elements of each drum 42, 43 includes full bars 131, upper bars 133 and lower bars 135. The general columnar arrangement of the printing elements is a series having an alphanumeric, a full bar, an alphanumeric, an upper bar, an alphanumeric, a full bar, an alphanumeric, a lower bar, an alphanumeric, a full bar, and so forth. In accordance with the teachings of the invention, each column of printing elements having bar printing elements is provided with matching bar printing elements. That is, each column of printing element having bar printing elements includes at least two bar printing elements which represent the same imprinted bar, the matching bar printing elements being equally spaced from one another. For example, in the case of two matching bar printing elements, the bars are spaced apart 180° and in the case of three matching bar printing elements, the bars are spaced apart 120°, and so forth. Print drums 42 and 43 are mounted to shaft 108 and rotate therewith, a gap 132 separating the rows of characters on each drum. Preferably, print drums 42 and 43 constitute an integral structure that is formed with at least two sets of characters, one set of characters for printing each document. In alternative embodiments, print drums 42 and 43 constitutes separate print drums that are fixed to a common shaft, each print drum having a set of characters for printing each document. It is to be noted that one set of characters is provided for each document to be printed.

As shown in FIG. 3, shaft 108 carries an encoding wheel 134 which is coded to correspond to the characters on print drums 42 and 43, each printing element having a unique address. A decoder 136 reads the coded signals on encoding wheel 134 and generates data signals representing print drum position signals which are used for selectively actuating ballistic hammer assemblies 44 and 50.

Each ballistic hammer assembly constitutes a set of free-floating ballistic elements. Each free-flowing ballistic element includes a ballistic hammer 138 and an impactor 140. As shown in FIG. 2, ballistic hammer 138 includes a housing 142 and a hammer 144. Impactor 140 includes an electromagnetic actuator 146, an impactor arm 148 and an impactor head 150. Housing 142 is formed with a guideway 152 which is adapted to slidably receive hammer 144. A bias element 154, for example a compression spring, is spiraled about hammer 144 within guideway 152. A retaining ring 156 is mounted to hammer 144 for holding spring 154 in such a manner that hammer 144 is biased downwardly within guideway 152. When actuator 146 is energized, impactor arm 148, which is pivoted about a pin 158, is pulled toward actuator 146, wherey impactor head 150 urges hammer 144 forward within guideway 152. Thereafter, impactor arm 148 decouples from hammer 144 and returns to a rest position. Hammer 144 continues its forward flight to strike the underside of the document blank, momentarily forcing the document against a raised character on the print drum. Hammer 144, aided by its compressed control spring 154, bounces back and the control spring assures a return to the rest position. One set of free-floating ballistic elements is provided for each set of print drum characters and one ballistic element is provided for each row of print drum characters. In the illustrated embodiment, there is two sets of print drum characters and two sets of ballistic elements. In alternative embodiments, the number of sets of print drum characters and ballistic elements is other than two, for example, three, four, five or more.

Referring again to FIG. 3, it will be seen that rotary cutter assembly 54 comprises a cam plate 160 having an eccentric cam track 162 is mounted to shaft 108. A crank arm 164 having a cam follower 166 is mounted to a shaft 168 having a cutter 170 mounted thereto. An extending arm 172 of an actuator 174 is mounted to crank arm 164. When actuator 174 is energized, cam follower 166 is engaged by cam track 162 and cutter 170 is rotated. Cutter 170 is formed with a concave cutting edge 176 which engages printed blanks 24 and 26 when cutter 170 is engaged by cam track 162. A cutter block 178 is mounted in registration with cutting edge 176, blanks 24 and 26 being threaded between cutter 170 and block 178. In consequence, when cutter 170 is rotated, the blanks are severed simultaneously by the scissor-like action of cutting edge 176 and cutting block 178.

The severed printed document 24 and 26 are dispensed from the printing system by means of eject roller assembly 52 which includes a drive roll 180 and an idler roll 182 for frictionally engaging the printed documents. Drive roll 180 is mounted to shaft 128 and is continuously rotated by endless belt 124. Document blanks 24 and 26 are threaded between drive roll 180 and idler 182 and exit through slots 184 and 186, respectively. A pair of plates 188 and 190 constitute a guideway through which printed boarding passes 24 are fed into slot 184. Although not shown, a pair of plates are provided for feeding printed baggage tags 26 into slot 186. The printed boarding pass and printed baggage tag advance between drive roll 180 and idler roll 182 during the printing cycle but are not ejected from the printing system until severed by rotary cutter assembly 52. Eject assembly 52 maintains the printed documents in a stressed condition to enhance cutting.

Figure 7:
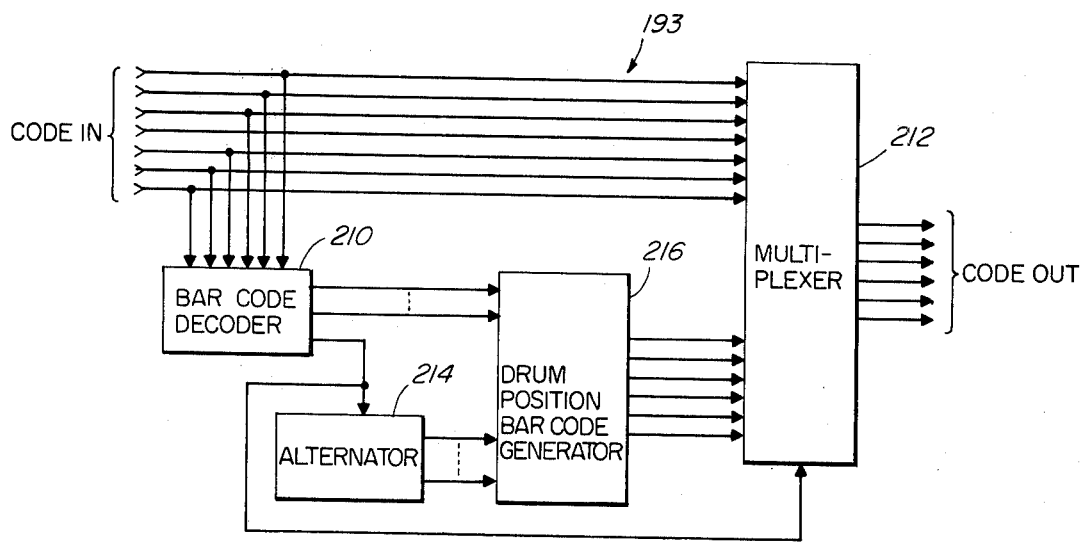
FIG. 7 is a block diagram of the processor of FIG. 1.

As previously indicated, terminal 12 generates coded data signals defining print messages such as alphanumeric and bar code messages. In the illustrated embodiment, terminal 12 is a keyboard and the print messages are generated by an operator selectively depressing keys 192. The coded data signals generated by keyboard 12 are applied to a processor 193. The bar code messages are converted in processor 193 for imprinting alternate ones of the matching bar printing element images in response to successive coded signals representing the same bar. As shown in FIG. 7, processor 193 includes a bar code decoder 210 for detecting bar code messages generated by keyboard 12. Print messages that are other than bar code messages are applied directly to a multiplexer 212. When a bar code message is detected, bar code decoder 210 generates an advance signal which is applied to an alternator 214 and multiplexer 212. The advance signal generated by bar code decoder 210 indicates that a bar code message has been decoded. The bar code message applied to bar code decoder 210 includes unique address locations of the particular type bar that is to be imprinted on the document, for example a full bar, an upper bar or a lowr bar. The coded signals defining the unique address of the bar types to be printed pass through bar code decoder 210 and are applied to a drum position bar code generator 216. Alternator 214, a binary counter, generates data signals that are applied to drum position bar code generator 216, a read only memory, which generates data signals representing addresses of alternate ones of the matching bar printing elements that correspond to the bar printing element defined by the coded data signal generated by keyboard 12.

Command signals generated by multiplexer 212 are applied to a controller 195 which generates signals for energizing motor 60 and pinch and brake assemblies 38 and 46. In response to these signals, boarding pass blanks 24 and baggage tag blanks 26 are slewed to a selected position by their respective pinch and brake assemblies. The selected position is determined by head of form sensors 194 and 196 that sense indicia 198 on boarding pass blanks 24 and baggage tag blanks 26. In the illustrated embodiment, by way of example, each head of form sensor includes a light source of photodetector mounted on opposite sides of the blanks. Indicia 198 is a hole formed in the blanks at selected intervals. Light from the light source is detected by the photodetector when the hole passes as the blanks advance. Pinch and brake assemblies 38 and 46 are deenergized and blanks 24 and 26 are stopped. Boarding pass blanks 24 and baggage tag blanks 26 are now in position in print stations 40 and 48 for printing the first row of characters thereon. Ballistic hammer assemblies 44 and 50 are selectively energized as the proper character on print drums 42 and 43 are opposite the free-floating ballistic elements. Print drums 42 and 43 rotate continuously and the ballistic elements urge the document blanks against the print drums when the character to be printed is opposite the ballistic element as determined from encoder wheel 134 and processor 193. That is, a comparison is made in data comparators 197 and 199 between the data signal generated by keyboard 12 and character position signals generated by decoder 136 and drum position bar code generator 216.

Coded data signals generated by keyboard 12 that do not represent bar code messages pass directly through multiplexer 212 and are compared with the angular drum position code signals generated by decoder 136. When a match is made in data comparators 197 and 199, a proper character is struck and a corresponding impression is made on the documents. However, if a bar code message is decoded in bar code decoder 210, the advance signal reverses the multiplexer control. In consequence, a coded data signal generated by drum position bar code generator 216 passes through multiplexer 212 instead of the coded data signals generated by keyboard 12. The code message defined by the coded data signals generated by drum position bar code generator 216, a properly encoded addressable read only memory, is a function of the type of bar code received and of the state of alternator 214, a binary counter with 2, 4, or 8 capacity. The state of alternator 214 is changed every time a bar code is received, whereby a different code is generated by drum position bar code generator 216. Although a different code is generated for each code type received, the generated codes correspond to the proper angular position of the print drum so that the correct bar is printed by using a different angular drum position at which there is located a matching one of the bars to be imprinted.

The circuitry and logic of processor 193 are simplified substantially if the codes for the bar imprints are chosen judicially. In the illustrated embodiment of FIG. 7, codes fifty two to the base eight ($52_8$) and fifty three to the base eight ($53_8$) are used for the two types of bar. Code $52_8$ (101010) represents binary "1" and code $53_8$ (101011) represents binary "0." One of these two codes are transmitted from drum position bar code generator 216 for printing a specific bar code. In this embodiment, each column of raised printing elements has four bar characters, two for each type. The two bars of the first type are position encoded $54_8$ and $56_3$. The two bars of the second type are position encoded $55_8$ and $57_8$. These four codes (1011XX) are not transmitted to controller 195. The circuitry in FIG. 7 is operative to alternate the bar codes between the two drum positions.

Figure 8:
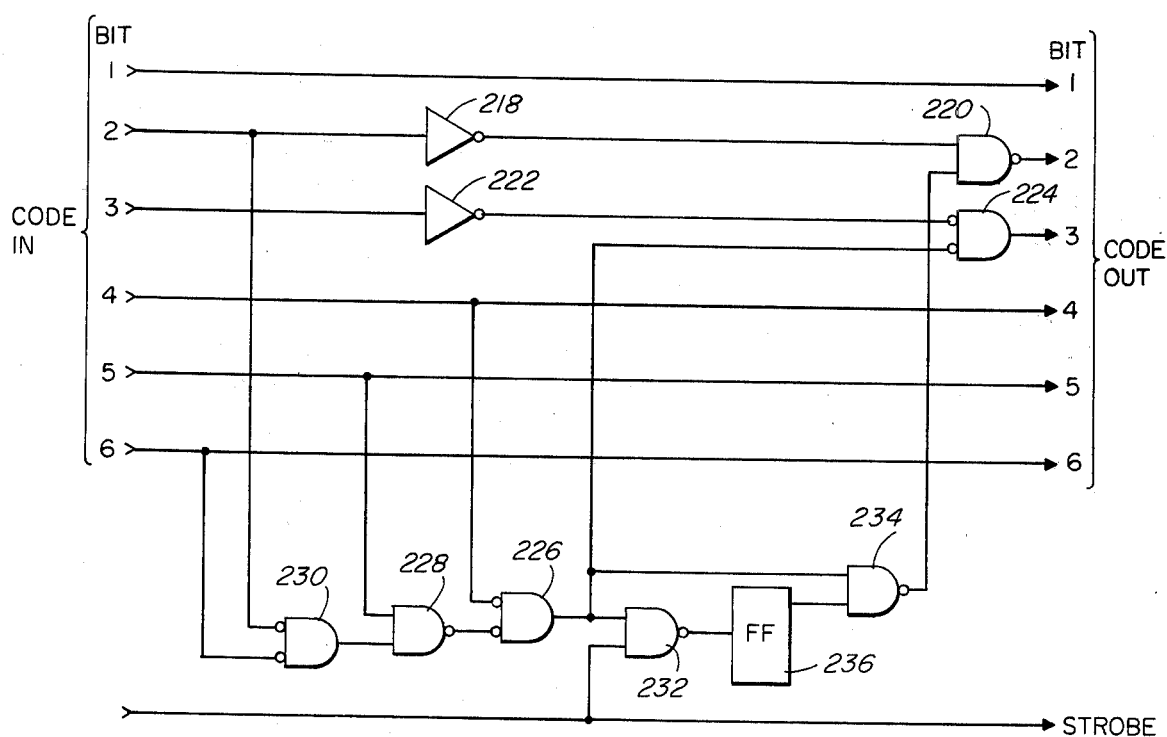
FIG. 8 is a schematic diagram of the processor of FIG. 7.

As shown in FIG. 8, the incoming code are presented in inverted form. That is, high voltage level for logical "0" and low level for logical "1." Character bits 1 (low significant) 4, 5 and 6 are transmitted to controller 195 without modification. Bit 2 is fed through an inverter 218 and a NAND gate 220. The signal at the output terminal of NAND gate 220 is low only when the signals at its input terminals are both high. Bit 3 is directed through an inverter 222 and a NAND gate 224. The signal at the output terminal of NAND gate 225 is high only when the signals at its input terminals are low. Bits 2 and 3 are transmitted to controller 195 without modification, being twice inverted, if the signal at the output terminal of a NAND gate 226 is low. NAND gate 226 receives bit 4 on one of its input terminals and the signal at the output terminal of a NAND gate 228 on the other of its input terminals. NAND gate 228 receives bit 5 on one of its input terminals and the signal at the output terminal of a NAND gate 230 on the other of its input terminals. NAND gate 230 receives bits 2 and 6 on its input terminals. The output terminal of NAND gate 226 is connected to input terminals of NAND gates 224, 232 and 234. The other input terminal of NAND gate 224 is connected to the output terminal of inverter 222. The other input of NAND gate 232 receives the advance signal or strobe generated for each consecutive bar code. The signal at the output of NAND gate 232 is applied to a flip-flop 236, the output terminal of which is connected to the other input terminal of NAND gate 234. The signal at the output terminal of NAND gate 234 is transmitted to one input terminal of NAND gate 220, the other input of NAND gate 220 being connected to inverter 218.

As previously indicated, bits 2 and 3 are transmitted without modification, being twice inverted, when the signal at the output terminal of gate 226 is low. The signal at the output terminal of gate 226 is low when the signal at either of its input terminals is high. If any bar code is decoded by gates 226, 228 and 230 (decoded are $52_8$, $53_8$, $56_8$ or $57_8$ = 101X1X in binary form), the signal at the output terminal of gate 226 is high or logical "0." In consequence, the signal at the output terminal is low or logical "1." When the signal at the output terminal of gate 226 is high, the signal at the output of gate 232 goes low when the strobe signal is applied to its other input terminal. In consequence, flip-flop 236 changes state. It is to be noted that flip-flop 236 changes its state for each consecutive bar code received. In turn, the level of bit 2 at the output of NAND gate 220 changes for each consecutive bar code. Thus, the first input bar code $52_8$ (101010) changes alternately between codes $54_8$ (101011) and $56_8$ (101110) at the output of processor 193. The second input bar code $53_8$ (101011) changes alternately between codes $55_8$ (101101) and $57_8$ (101111) at the output of processor 193. In the final result, the same bar is printed from two character positions on the print drum each time and each bar is inked at least twice before it is used. That is, alternate ones of the matching bar printing elements are used on successive complete rotations of the drums 42, 43. Whereby, each bar printing element that is used for printing a bar is inked twice by ink roller 200 before it is pressed against the baggage tag or boarding pass blanks.

As previously indicated, a comparison is made in data comparators 197 and 199 between the data signal generated by keyboard 12 and character position signals generated by decoder 136 and drum position bar code generator 216. When a comparison is made, hammer controls 201 and 203 are energized for actuating hammer assemblies 44 and 50, respectively. As previously indicated, ink is suppled to each print drum 42 and 43 by means of ink roller 200 rotatably mounted to a bracket 202 fixed to housing 14. After the first row of characters is printed on each blank, pinch and brake assemblies 38 and 46 are energized for incrementally advancing the boarding pass blanks 24 and baggage tag blanks 26 through their respective print station. As each blank is incrementally stepped, another row of characters is printed. The cycle continues until all the characters have been printed on each blank. The bar imprints are well defined with good contrast, each bar imprint being made with a bar printing element that has been in contact with ink roller 200 at least twice before it is used.

A typical bar code message, shown in FIG. 6, consists of a seven digit decimal man readable number, 4 bit binary code for each digit including parity followed by an identification code with parity represented by a series of vertical lines on single or double space. The identification code represents the binary code of each digit in the man readable number. The code starts with a reference of two bars single spaced. A binary "1" is represented by a bar at the same space as the previous bit. For example, the reference start is single spaced bars followed by a binary "1" which is represented by another bar at the same space (single). The binary "$\phi$" is represented by a bar at a different space than the previous bit. For example, the reference start is single spaced bars followed by a binary "$\phi$" which represented by another bar at a different space (double). The 4 bit parity code determined if the previous code interpretation is legitimate. The sum of the "1's" in each of the 1, 2, 4, and 8 bits must be an even count. If the sum is odd, the count is forced to even by adding "1" in the 1, 2, 4 or 8 bits of the parity code. If the sum is even, a "$\phi$" is added to the 1, 2, 4 or 8 bits of the parity code. The parity code is a direct continuation of the decimal number code.

If the printing of one blank is completed before the printing of the other blank, the printed blank is slewed by energizing its pinch and brake assembly until the next indicia 198 is sensed by the head of form sensor. When the other blank is printed completely, it is slewed by its pinch and brake assembly until the next indicia 198 is sensed by the head of form sensor. It is to be noted that the blanks are printed simultaneously until the printing is completed on at least one of the blanks. After the printing cycle is completed, rotary cutter assembly 54 is actuated by a signal generated by controller 195 and applied to acutator assembly 130. The printed boarding pass and baggage tag are severed simultaneously and dispensed from the printing system by eject roller assembly 54. In the illustrated example, two baggage tags are to be printed. Therefore, pinch and brake assembly 46 is energized for incrementally advancing another baggage tag blank 26 through print station 48 until the printing of the second baggage tag is completed. It is to be noted, while the second baggage tag is being printed, print and brake assembly 38 is deenergized and boarding pass blank 24 is held fixed. When the second baggage tag is printed, it is slewed until the next indicia 198 is sensed by head of form 196. Rotary cutter assembly 54 is actuated and the second baggage tag is dispensed. In the manner just described, the operator can print as many boarding passes and baggage tags as needed. As previously indicated, if more than two document blanks are to be printed, the printing system is provided with more than two print drums, the number of each document to be printed being controlled by the operator.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A system for printing bars on a web in response to coded data signals representing bar code messages, said system comprising:
   a. a rotatable print drum having at least one row of printing elements disposed about its periphery in an arcuate column, said column of printing elements including at least a pair of matching bar printing elements that are spaced from one another, each said printing element having a unique address defining a unique angular position on said drum;
   b. an impactor assembly associated with said print drum for pressing a web passing between said drum and said impactor assembly against selected ones of said bar printing elements for printing bars on the web, one row of bars printed during one revolution of said drum; and
   c. a processor for receiving a code data signal requesting the printing of one of said bars on the web, said processor converting said coded signal into command signals alternatively defining the address locations of said matching bar printing elements for successive rotations of said drum, said command signals actuating said impactor assembly for pressing said web against alternate ones of said pair of matching bar printing elements for successive coded signals requesting the printing of said one bar on the web for each complete revolution of said drum.

2. The system as claimed in claim 1 wherein said matching bar printing elements are spaced equally from one another about the periphery of said print drum.

3. The system as claimed in claim 1 including ink roller means in contact with said drum for inking said printing elements, said matching bar printing elements against which said web is pressed are inked at least twice before being contacted by said web.

4. A system as claimed in claim 3 wherein said matching bar printing elements are spaced equally from one another, said impactor assembly pressing said web against alternate ones of said matching bar printing elements for successive rotations of said drum.

5. A system for printing bars on a web in response to coded data signals representing bar code messages, said system comprising:
   a. rotatable print drum means having at least one row of raised printing elements disposed about its periphery in an arcuate column, each of said printing elements is located at a unique angular position on the periphery of said print drum means, each said angular position defined by a unique address, each said column having at least two matching bar printing elements spaced apart about the periphery of said print drum means;

b. a single ink roller contacting said print drum means as it rotates for inking said raised printing elements;

c. impactor means associated with said print drum means for printing bars on the web, one row of bars printed during one revolution of said drum means, a print gate located between said impactor means and said print drum means;

d. means for advancing a web into said print gate;

e. controller means for selectively actuating said impactor means, said web pressed against selected one of said printing elements when said impactor means is actuated; and f. processor means for receiving coded data signals representing a request for printing one of the matched bars on the web and for generating command signals that are applied to said control means for actuating said impactor means, said processor means converting successive ones of said coded data signals defining one of said matching bar printing elements into command signals defining alternate addresses at which said matching bar printing elements are located, said web pressed against alternate ones of said matching bar printing elements for successive coded data signals requesting the printing of one of the matched pair of bar printing elements, each of said successive coded data signals defines the same address location of one of said matching bar print elements, said web pressed against bar printing elements that have been inked at least twice.

6. The system as claimed in claim 5 wherein said matching bar printing are spaced apart equally about said print drum means periphery.

7. A system for simultaneously printing at least two documents blanks, said system comprising:

a. a motor;

b. cylindrical print drum means rotated by said motor, said print drum means having at least two sets of raised printing elements disposed in rows and arcuate columns about the periphery thereof, at least one of said columns having at least a pair of matching bar printing elements;

c. a single ink roll in contact with said print drum means;

d. ballistic hammer means for each said set of printing elements, a first print station located between one of said set of print elements and one of said ballistic hammer means, a second print station located between the other of said set of printing elements and the other of said ballistic hammer means, said first print station receiving one of said document blanks, said second print station receiving the other of said document blanks;

e. feed means operatively connected to said motor for independently advancing each said document blank into and through its respective print station, said print drum means and said ballistic hammer means cooperating to print said document blanks as they pass through their respective print stations;

f. processor means for receiving coded data signals defining a unique address location for one of said matching bar printing elements, said processor means converting successive coded data signals defining the same unique address location of alternate ones of said matching bar printing elements for printing alternate one of said matching bar printing elements on successive complete rotations of said print drum means; and g. cutter means operatively connected to said motor for severing said printed document blanks.

8. The system as claimed in claim 7 wherein said feed means includes first and second pinch and brake means, said first pinch and brake means including first and second means adapted for mutually exclusive engagement and disengagement with one of said documents, said second pinch and brake means including first and second means adapted for mutually exclusive engagement and disengagement with the other of said documents.

9. The system as claimed in claim 8 wherein said first means of said first and second pinch and brake means includes an idler capstan and a drive capstan, said idler capstan and said drive capstan in spaced relationship to one another on opposite faces of said documents, said second means of said first and second pinch and brake means includes a pair of brakes disposed on opposite faces of said documents.

10. The system as claimed in claim 9 wherein each said pinch and brake means includes:

a. a housing;

b. a rocker arm;

c. resilient means, said rocker arm pivotally mounted to said housing by said resilient means; and d. actuator means operatively connected to said housing and rocker arm for pivoting said rocker arm, said actuator means having first and second states;

e. said idler capstan mounted to said rocker arm at one end thereof;

f. one of said brakes mounted to said rocker arm at an opposite end thereof;

g. said document frictionally engaged between said idler and drive capstans and disengaged from said brakes when said actuator is in said first state;

h. said document frictionally engaged between said brakes and disengaged from said idler and drive capstans when said actuator is in said second state.

11. The system as claimed in claim 10 wherein said cutter means includes:

a. cylindrical cutter means formed with an opening defining a cutting edge having a substantially concave profile, said cylindrical cutter means disposed in juxtaposition with one face of said documents, said cutting edge adatped for engagement with said documents; and b. a solenoid having a reciprocating piston operatively connected to said cylindrical cutter means;

c. said piston retracted into said solenoid when energized, said cylindrical cutter means rotating when said piston is retracted, said concave cutting edge engaging and severing said documents when said cylindrical cutter means is rotated.

* * * * *